United States Patent Office 3,525,018
Patented Aug. 18, 1970

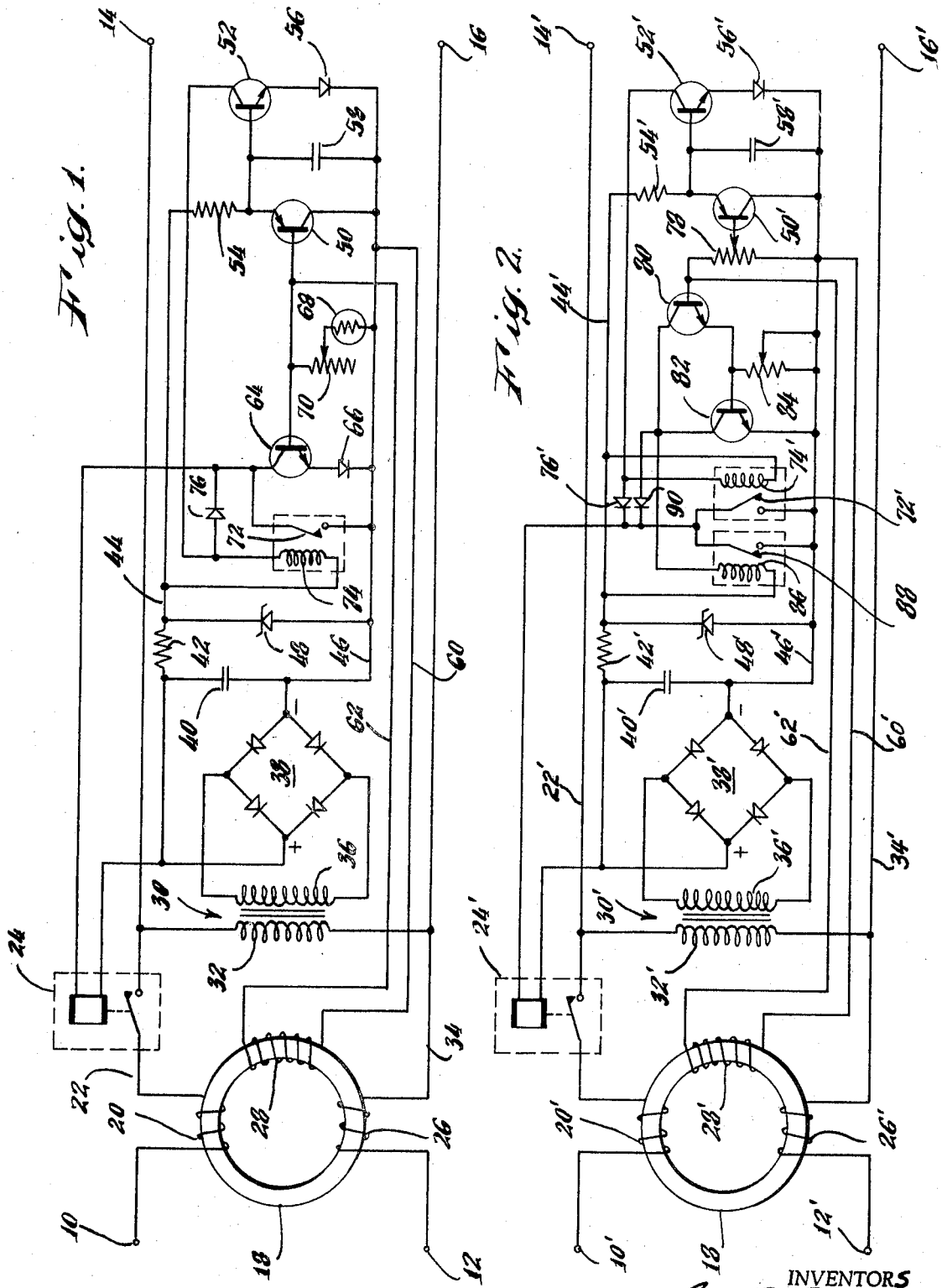

3,525,018
GROUND LEAKAGE CURRENT INTERRUPTER
Robert M. Murphy, Fairfield, and Alton R. Morris, Trumbull, Conn., assignors to Harvey Hubbell, Incorporated, Bridgeport, Conn., a corporation of Connecticut
Filed June 27, 1968, Ser. No. 740,662
Int. Cl. H02h 3/28
U.S. Cl. 317—18      10 Claims

ABSTRACT OF THE DISCLOSURE

A ground leakage current interrupter of the differential transformer type is disclosed which has safeguards against high leakage currents. A solid state circuit is provided in which high voltage on the transformer secondary is shorted during both halves of the power cycle. Voltage buildup on the secondary is amplified by the solid state circuit which closes and latches a reed relay. The reed relay operates the main circuit breaker.

BACKGROUND OF THE INVENTION

One of the most important developments in recent years in the field of electrical safety devices is the ground leakage current interrupter. These devices customarily include a differential transformer having a single core with a pair of primary windings, each winding being connected in one of the two conductors supplying the load to be protected. The primary windings are so wound that they produce in the core magnetic fields which oppose one another. A secondary winding is also provided on the core and suitable circuitry is provided such that, when a voltage develops across the secondary winding, it will open a circuit breaker in the supply conductors. Under normal conditions, the currents in the supply conductors and the primary windings are equal. Thus, the resultant flux produced in the core by the primary windings is zero and no voltage is developed across the secondary winding. However, when a separate path to ground is established —as, for example, through a human body—the currents in the primary windings will immediately become unbalanced. A resultant flux is then produced in the transformer core which induces a voltage across the secondary winding. This voltage thereupon actuates the tripping circuit which opens the circuit breaker and disconnects the load from the power supply.

It is desirable to employ solid state electronics, such as transistor amplifiers, in the tripping circuit of the ground leakage current interrupter. Because of the sensitivity of such circuits, fewer primary turns are required on the transformer. This permits more current to flow through the transformer without creating heat problems. The use of reed relays in the tripping circuit is also desirable because they are fast operating devices. Furthermore, they have an inherent time delay which is desirable as it prevents them from operating under short term transient conditions. The use of solid state electronic devices does, however, create certain problems at high currents. When a relatively high fault current exists, high voltage is generated across the secondary winding. This voltage may cause damage to the electronic devices. Furthermore, it will be obvious that such faults may appear in either half of the alternating current cycle.

Still another disadvantage of prior art current interrupters is that their differential transformers employ a toroidal core having a high permeability and no magnetic gaps. Such cores are relatively expensive and it would be desirable to employ a conventional laminated transformer core. However, this has not been done in the past because the decreased sensitivity of such cores made them relatively unreliable with the mechanical relays usually employed.

Still another disadvantage of prior art devices has been the fact that no redundancy was built into the circuits. Thus, a failure, for example of one of the electronic devices, might render the device inoperable.

Accordingly, it is an object of the present invention to provide a ground leakage current interrupter which requires fewer primary turns on the differential transformer.

Another object is to provide such an interrupter wherein the differential transformer may have a standard laminated transformer core.

Another object is to provide such an interrupter having a highly sensitive solid state electronic tripping circuit.

Another object is to provide such an interrupter wherein the electronic tripping circuit is shorted on both half cycles under conditions of high ground fault current.

Another object is to provide such an interrupter having redundancy in the electronic tripping circuit, thereby permitting operation of the interrupter even in the event of failure of electronic components.

Other objects, features and advantages will be apparent from the following description, the appended claims and the figures of the attached drawing.

SUMMARY OF THE INVENTION

The objects of this invention are achieved by means of a ground leakage current interrupter including a differential transformer with its primary windings in series with conductors supplying the load to be protected. A circuit breaker is connected in at least one of the conductors. Solid state amplifier means is connected across the secondary winding of the transformer and short circuits the secondary winding under conditions of high secondary voltage during both the positive and negative half cycles. Switching means operable by the amplifier means is connected in series with the operating element of the circuit breaker across a D.C. power supply and opens the circuit breaker at a preselected level of secondary current.

BRIEF DESCRIPTION OF THE DRAWING

The circuit of the ground leakage current interrupter of this invention may be best understood by reference to the drawing wherein:

FIG. 1 is a schematic diagram of the circuit of the invention; and

FIG. 2 is a schematic diagram of a modified circuit in accordance with the invention.

DESCRIPTION OF THE PREFERRED EMBODIMENTS

With particular reference to FIG. 1, there is illustrated a circuit for a ground leakage current interrupter which includes input terminals 10, 12 which may be connected to an alternating current power supply, and output terminals 14, 16 which may be connected to a load to be protected. In the disclosed embodiment, the terminal 10 would normally be connected to the line side of the power supply and the terminal 12 to the neutral, grounded, side. A transformer core 18 is provided with a primary winding 20 connected in the power line 22 between input terminal 10 and output terminal 14. Also connected in this line are the contacts of a circuit breaker 24. Another primary winding 26 is also provided on core 18 in neutral line 34 in series between input terminal 12 and output terminal 16. Primary windings 20, 26 are wound in such a manner that, under conditions of equal and opposite current flow, they produce in core 18 equal and opposite magnetic fields. A secondary winding 28 is also provided on core 18.

A transformer 30 has its primary winding 32 connected between power line 22 and neutral line 34. The secondary winding 36 supplies a full wave rectifier 38. Connected across the D.C. output of rectifier 38 is a smoothing capacitor 40 and an electronic triggering circuit supplied through a current limiting resistor 42. The electronic triggering circuit is powered by rectifier 38 from a positive conductor 44 and a negative conductor 46. This triggering circuit includes a Zener diode 48, a PNP transistor 50, and an NPN transistor 52. These transistors are connected with the base of transistor 52 being connected to the emitter of transistor 50. A resistor 54 is connected between the emitter of transistor 50 and the positive conductor 44. A diode 56 is connected between negative conductor 46 and the emitter of transistor 52 and a capacitor 58 is connected between the base of transistor 52 and negative conductor 46. One end of secondary winding 28 of the differential transformer is connected by a lead 60 to the negative conductor 46 and the other end of secondary winding 28 is connected by lead 62 to the base of transistor 50 and to the base of another NPN transistor 64. The emitter of transistor 64 is connected to negative conductor 46 through a diode 66. A thermistor 68 and potentiometer 70 are in series between the bases of transistors 50, 64 and negative conductor 46. The contacts 72 of a reed relay are connected between the collector of transistor 64 and the negative conductor 46. The coil 74 of the reed relay is connected in series between positive conductor 44 and the collector of transistor 52. A diode 76, polarized as shown, is connected between the reed relay coil 74 and contacts 72. The coil of circuit breaker 24 is in series with the contacts 72 of the reed relay across the positive and negative terminals of the rectifier 38.

The operation of the circuit of FIG. 1 will now be explained. When no output voltage signal is being produced by secondary winding 28, transistor 50 will conduct and will substantially short circuit the base-emitter circuit of transistor 52. This will cause the base of transistor 52 to have a relatively low positive voltage with respect to the voltage of negative conductor 46. For example, in one actual embodiment, such voltage would be approximately +.6 volt with respect to negative conductor 46. Accordingly, transistor 52 will not conduct. Assuming, now, a current unbalance between power line 22 and neutral line 34, a voltage signal will appear across the secondary winding 28 and be applied to the base-collector circuit of transistor 50. This will be an alternating current signal and, during one-half of the cycle, will drive the base of transistor 50 more positive with respect to the negative conductor 46. Transistor 50 will thereupon conduct less current and the voltage at its emitter will begin to go more positive. This positive voltage is also applied to the base of transistor 52. Transistor 52 will just begin to conduct when this voltage is approximately +1.2 volts. As the error signal goes more positive, transistor 52 will conduct more and coil 74 of the reed relay will become energized, closing reed relay contacts 72. Contacts 72 are then latched in their closed position by completion of the circuit between coil 74, diode 76 and contacts 72. Closure of reed relay contacts 72 also completes the circuit through the coil of circuit breaker 24 across the D.C. power supply, causing breaker 24 to trip, disconnecting output terminal 14 from the power supply and interrupting power to the load. As soon as the reason for the unbalance is corrected, breaker 24 may be reset. Thereupon, the current interrupter is once again ready for operation.

Under relatively low fault current conditions, transistor 64 will remain non-conductive during both the positive and negative half cycles of secondary voltage. Assume, however, that a large fault current develops— large enough, for example, to create a secondary voltage of approximately ten volts or greater. When the polarity of this voltage is such that the bases of transistors 50 and 64 are positive, transistor 50 will become less conductive, as previously explained. Simultaneously, the resistance of the base-emitter circuit of transistor 64 drops substantially, thus shunting much of the high voltage current flow of secondary winding 28 to protect the electronic devices. Furthermore, this transistor becomes conductive at approximately the same time as transistor 52. This immediately energizes the coil of breaker 24 and reduces the time for tripping. If, for example, it takes 1 millisecond for the reed relay to become energized, the time normally required for breaker 24 to operate from the time a leakage current develops will be decreased by 1 millisecond. If breaker 24 requires 6 milliseconds to operate after power is applied to its coil, the breaker will operate in 6 milliseconds, rather than in the 7 milliseconds required in the absence of transistor 64.

Under the same conditions of high fault current, when the bases of transistors 50 and 64 are negative, transistor 50 will become conductive, effectively short-circuiting the secondary winding 28 to protect the circuit components.

In addition to the foregoing, transistor 64 provides redundancy in that, if any of transistors 50, 52 or the reed relay were to become inoperative, breaker 24 would still trip. The circuit would be somewhat less sensitive, however, and a higher leakage current would be required to cause the interrupter to function.

Although it will be apparent to one skilled in the art that the foregoing circuit may be modified in accordance with the particular requirements, in one actual embodiment the values of the circuit components were as follows:

EXAMPLE I

Core 18—High permeability tape wound
Windings 20, 26—3 turns
Winding 28—1500 inches
Transformer 30—4:1
Capacitor 40—25 μfd., 50 v.
Capacitor 58—.1 μfd.
Resistor 42—1000 ohms
Resistor 70—200K ohms
Thermistor 68—1700 ohms at 25° C.
Diodes 66, 76—IN4001
Diode 56—IN457
Diode 48—15 V. Zener
Resistor 54—33K ohms
Transistors: 52, 64—2N3417
  50—2N3638
Breaker 24—Circuit breaker (Airpax APL–4)

The modified circuit of FIG. 2 is, in many respects, substantially similar to that of FIG. 1. Accordingly, similar components are given similar reference numerals with a prime (') attached. The primary difference between the circuit of FIG. 2 and that of FIG. 1 is the addition of complete redundancy and a second two transistor amplifier stage is incorporated. In FIG. 2, the base of transistor 50' is connected to the movable tap of a potentiometer 78 connected across the secondary winding 28'. The second amplifier comprises a transistor 80 and a transistor 82, connected as shown with the emitter of transistor 80 connected to the base of transistor 82. A potentiometer 84 is connected between the base of transistor 82 and the negative conductor 46'. The coil 86 of a second reed relay is connected between positive conductor 44' and the emitter of transistor 82 and the contacts 88 of this reed relay are connected in series with the coil of relay 24' across the positive and negative conductors. Latching of this second reed relay is provided by an additional diode 90.

In utilizing the circuit of FIG. 2, the potentiometer 78 would be adjusted so that the amplifier formed by transistors 50' and 52' would trip the breaker 24' at a leakage current of 3.5 ma. The potentiometer 84 would be adjusted so that the amplifier formed by transistors 80, 82 would cause the breaker to trip a leakage current of 4.0 ma. It will thus be seen that, in the event of a failure in either amplifying stage, the other stage would cause the breaker 24 to trip. This would provide a high reliability safety system, most important in saving human lives.

The values of the electronic components of the circuit of FIG. 2 are similar to those of FIG. 1. However, the substituted or added components have the following values:

EXAMPLE II

Resistor 84—10K ohms
Potentiometer 78—200K ohms
Diode 90—1N4001
Transistors 80, 82—2N3417

It is believed that the many advantages of the circuits of this invention will be apparent to those skilled in the art. Some of these advantages are as follows:

(1) Both circuits use transistor amplifiers. The use of transistor amplifiers permits fewer primary turns on the differential transformer, thus allowing more current to flow without heat problems.

(2) Both circuits employ reed relays for switching and latching. The reed relay is ideal for a ground leakage current interrupter as it is a fast operating device. Furthermore, it has an inherent time delay in operating time which is desirable as it is prevented from operating on short term transients.

(3) Both circuits described are fully redundant, a factor of great importance in a safety device.

As various other variations and modifications will be apparent to those skilled in the art, it is to be understood that the foregoing description is intended to be illustrative only, rather than limiting. This invention is limited only by the scope of the following claims.

What is claimed is:

1. A ground leakage current interrupter comprising: a differential transformer having at least two primary windings and a secondary winding; means connecting each of said primary windings in series with a different conductor supplying a load to be protected; circuit breaker means in at least one of said conductors; a D.C. power supply; solid state amplifier means having its input connected to short-circuit said secondary winding under conditions of high secondary voltage during both the positive and negative half cycles of voltage developed thereacross; and switching means operable by said amplifier means in series with the operating element of said circuit breaker means across said power supply to energize said operating element and open said circuit breaker means upon occurrence of a preselected level of current through said secondary winding.

2. The interrupter of claim 1 wherein said amplifier means comprises first and second amplifiers having their input circuits connected in parallel across said secondary winding.

3. The interrupter of claim 2 wherein said switching means is operable by either of said first and second amplifiers under conditions of high secondary voltage.

4. The interrupter of claim 3 wherein said first amplifier is a two stage amplifier, the first stage comprising a transistor having its collector-emitter circuit connected across said power supply and substantially conductive in the absence of ground fault current.

5. The interrupter of claim 4 wherein the second stage comprises a transistor having its input circuit connected across the output of said first stage, the conductivity of its collector-emitter circuit varying inversely with that of said first stage.

6. The interrupter of claim 5 wherein said switching means comprises a first relay including an operating coil in series with the collector-emitter circuit of said second stage transistor.

7. The interrupter of claim 6 wherein said switching means comprises a second relay in parallel with the contacts of said first relay including an operating coil connected to be energized by said second amplifier.

8. The interrupter of claim 7 wherein the output circuit of said second amplifier is in series with the operating coil of said second relay across said D.C. power supply.

9. The interrupter of claim 8 wherein said second amplifier is a two stage amplifier, the first stage comprising a transistor which is substantially nonconductive in the absence of ground fault current.

10. The interrupter of claim 1 wherein said switching means is a reed relay.

References Cited

UNITED STATES PATENTS 3,213,321  10/1965  Dalziel _____ 317—18
3,376,477  4/1968   Weinger _____ 317—18 X
3,407,337  10/1968  Benham _____ 317—18

JAMES D. TRAMMELL, Primary Examiner

U.S. Cl. X.R.
317—27, 33

PO-1050
(5-69)

UNITED STATES PATENT OFFICE
CERTIFICATE OF CORRECTION

Patent No. 3,525,018               Dated August 18, 1970

Inventor(s) Robert M. Murphy and Alton R. Morris

It is certified that error appears in the above-identified patent and that said Letters Patent are hereby corrected as shown below:

Column 4, line 34, "inches" should be ditto marks, as in specification, or specifically designated turns.

See specification as filed, page 8, line 10 from the bottom.

Column 4, line 42, "I" should be --1--.

line 43, "I" should be --1--.

See specification as filed, page 8, lines 3 and 2 from the bottom.

Column 4, line 46, ditto marks, as in specification, or specifically designated transistor should be inserted before "50".

See specification as filed, page 9, line 3.

Column 4, line 74 --at-- omitted after "trip".

See specification as filed, page 9, line 2 from the bottom.

SIGNED AND SEALED
NOV 17 1970

(SEAL)
Attest:

Edward M. Fletcher, Jr.
Attesting Officer

NOV. 17, 1970

WILLIAM E. SCHUYLER, JR.
Commissioner of Patents